United States Patent
Bonner, Jr. et al.

[15] 3,696,817
[45] Oct. 10, 1972

[54] TOBACCO THRESHING MACHINE

[72] Inventors: Charles W. Bonner, Jr.; Curtis T. Houck, both of Richmond, Va.

[73] Assignee: The Cardwell Machine Company, Richmond, Va.

[22] Filed: June 4, 1971

[21] Appl. No.: 149,932

[52] U.S. Cl.................131/145, 130/27 P, 146/122, 241/154
[51] Int. Cl..............................A24b 05/10
[58] Field of Search...131/145, 146; 241/152 R, 154; 146/122; 130/27 P

[56] References Cited

UNITED STATES PATENTS

| | | |
|---|---|---|
| 3,126,014 | 3/1964 | Bonner et al..............131/145 |
| 2,466,828 | 4/1949 | Samson.....................241/154 |
| 656,481 | 8/1900 | Scholtz..................131/146 X |

*Primary Examiner*—Samuel Koren
*Assistant Examiner*—J. F. Pitrelli
*Attorney*—Mason, Fenwick & Lawrence

[57] ABSTRACT

A tobacco threshing machine comprising a casing having a top charging opening and three vertically spaced threshing rotor assemblies having radially projecting knives coacting with cage structures adjacent the knife paths. The top rotor is axially shorter than the other two rotors and the intermediate rotor has no knives in the rotor portion extending beyond the end of the top rotor. A second charging opening is provided over the portion of the bottom rotor extending beyond the top rotor.

9 Claims, 4 Drawing Figures

PATENTED OCT 10 1972 3,696,817
SHEET 1 OF 2
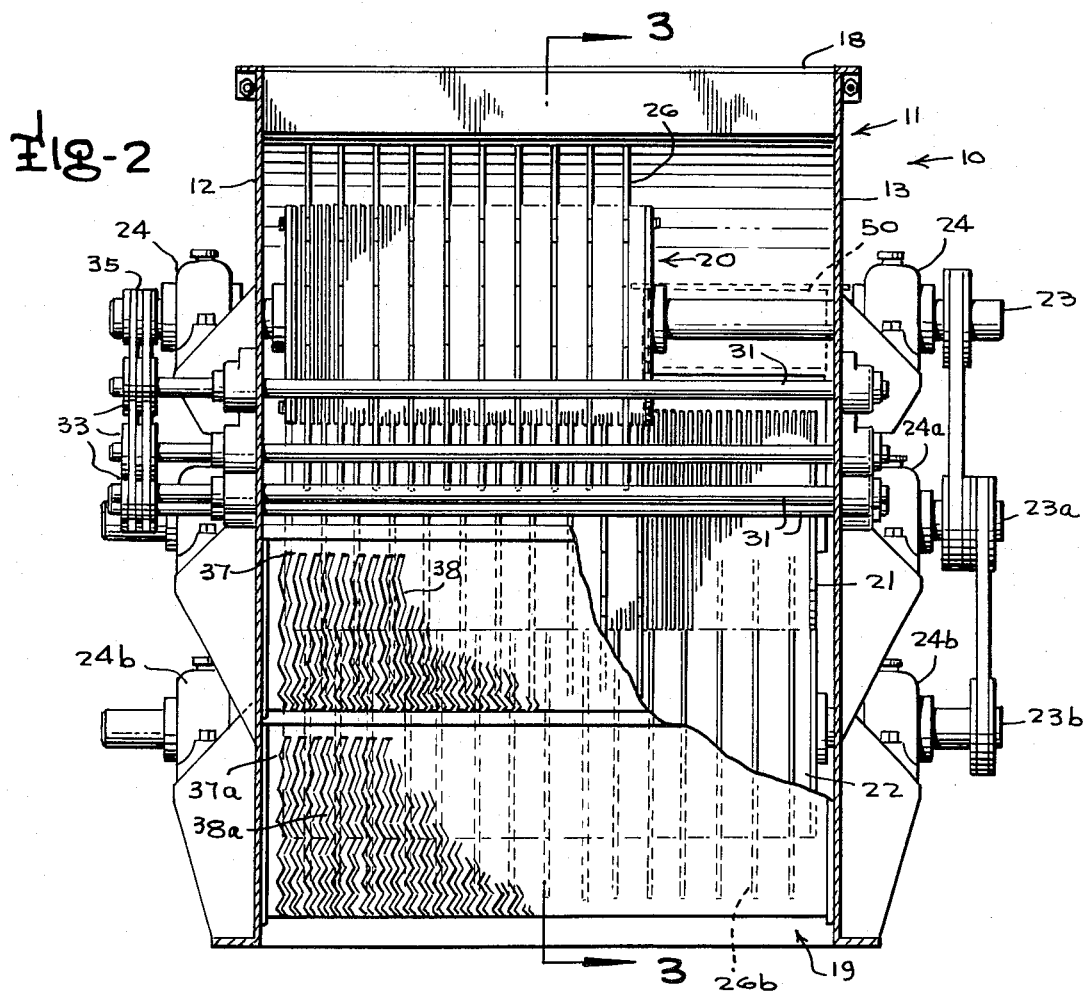
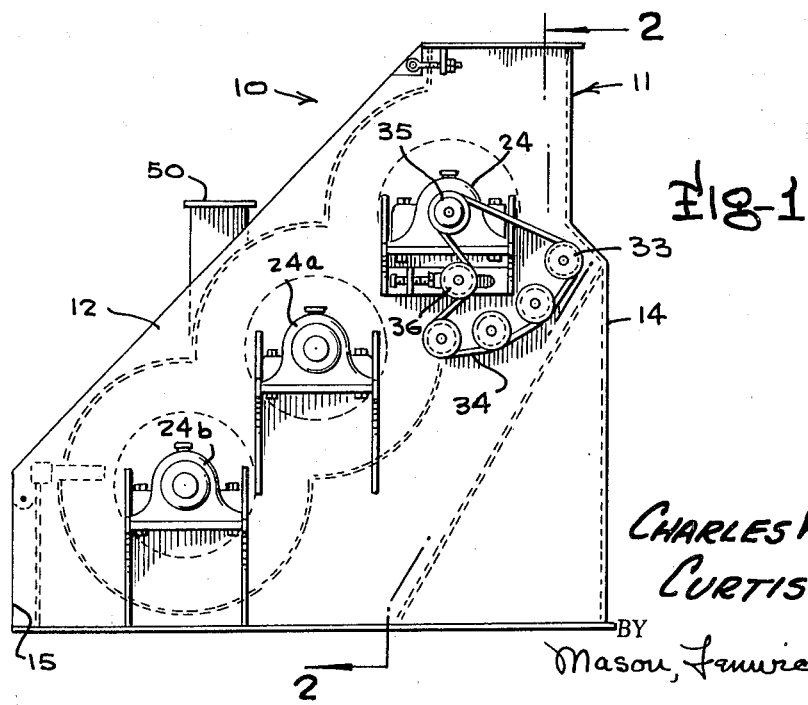
INVENTORS
CHARLES W. BONNER, JR. &
CURTIS T. HOUCK
BY Mason, Fenwick & Lawrence
ATTORNEYS

PATENTED OCT 10 1972

INVENTORS
CHARLES W. BONNER, JR. &
CURTIS T. HOUCK
BY
Mason, Fenwick & Lawrence
ATTORNEYS

TOBACCO THRESHING MACHINE

BACKGROUND AND OBJECTS OF THE INVENTION

The present invention relates to tobacco threshing machines for ripping and tearing leaf lamina from stems and large veins of tobacco leaves.

In the factory or commercial processing of tobacco as currently practiced, the tobacco leaf is broken up into lamina, stem and large vein components and the lamina components are separated from the others by passing the leaves through a series of threshing machines and pneumatic separators. Usually about four or more threshing stages, each involving a threshing machine, have been customarily employed, each followed by at least one pneumatic separator. The tobacco threshing machines currently in use have a rotary threshing element provided with radially extending teeth or knives coacting with stationary teeth and/or a perforated concave grid, cage or basket. The leaves dropped onto the rotor are driven by the rotor through the stationary teeth or are struck by the rotor teeth against the perforated edges of the concave grid or cage, causing the leaf to break up and the leaf components to fall through the cage perforations, whereupon they are delivered to the pneumatic separator for segregating the clean lamina components from the heavier stem and large vein parts. Such threshers generally produce a relatively small lamina product and leave substantial lamina adhering to the stem portions, so that the stem and adhering lamina portions must be subsequently processed through a plurality of successive threshing and separating stages to effect relatively complete removal of lamina from the stems. The use of a number of sets of such threshing machines and pneumatic separators is not only costly but consumes a considerable amount of valuable factory floor space.

More recently, we developed a machine, disclosed in U.S. Pat. no. 3,126,014, wherein a more efficient removal of leaf lamina from stems was achieved and a larger clean leaf lamina product was produced, by incorporating a pair of rotary threshing elements in the tobacco threshing machine coacting with each other and with concave cages of two different types to produce a larger clean lamina product and a mixed lamina and stem product which can be more easily separated. However, even with the two stage rotary threshing machine of the type disclosed in that patent, there still frequently remained a proportion of lamina adhering to stem portions which required further tobacco threshing to achieve complete removal of lamina from the stems. Furthermore, there are cases where it may be desired to subject the leaf or mixed lamina and stem to threshing by only a single rotor stage, or to reprocess product discharged from a threshing machine through only a single rotor stage.

An object of the present invention is the provision of a novel tobacco threshing machine which includes at least three rotary threshing elements arranged to achieve complete reduction of a leaf of tobacco in one pass into stem and lamina, and which is arranged to permit feeding of unthreshed leaf product to only the third or last stage of threshing or to permit recirculation of incompletely separated leaf product through the third or last stage of threshing whereby great versatility is obtained and a total threshing job can be achieved in a single machine.

Another object of the present invention is the provision of a novel tobacco threshing machine of the type described in the immediately preceding paragraph, wherein the first rotary threshing element has a first type of concave cage associated therewith and the remaining rotary threshing elements have a different type of concave cage from the first type associated with such remaining rotary threshing elements to achieve the desired separation of stem and lamina in the discharge product.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a side elevation of a tobacco threshing machine embodying the present invention;

FIG. 2 is a vertical transverse section view taken along the line 2—2 of FIG. 1;

DETAILED DESCRIPTION OF A PREFERRED EMBODIMENT

Figure 3:
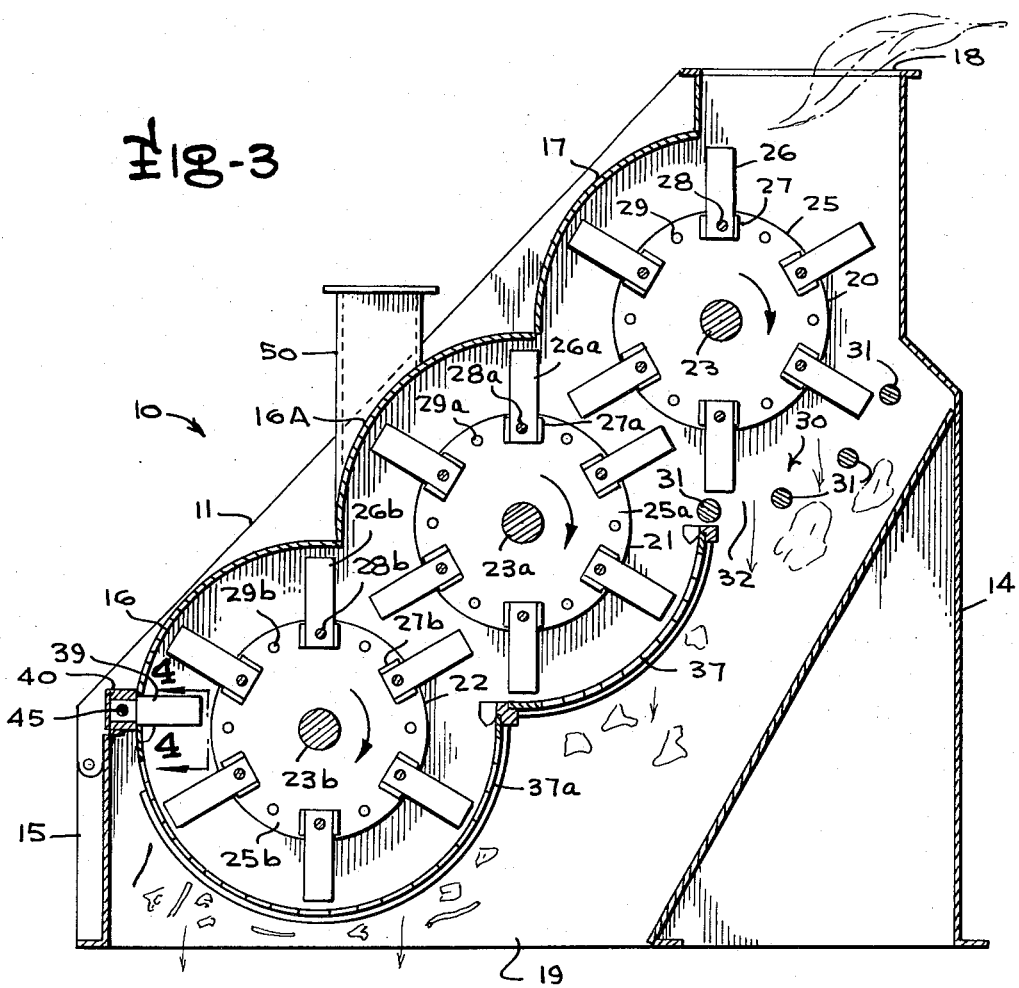
FIG. 3 is a vertical section view taken along the line 3—3 of FIG. 2.

Referring to the drawings, wherein like reference characters designate corresponding parts throughout the several figures, the tobacco threshing machine of the present invention, indicated in general by the reference character 10, is of the triple rotor or three stage type to rip large pieces of leaf lamina from the leaf in the first stage and discharge the same and pass the mixed pieces of lamina and stem to the second stage and then to the third stage to reduce the amount of lamina attached to the stem. The tobacco threshing machines includes a housing or casing 11 having a pair of side walls 12, 13, an upstanding end wall 14 at one end thereof and an upstanding end wall 15 in the lower region of the opposite end thereof which, together with pivoted concave doors 16, 16a and 17, complete the wall of the housing opposite the wall 14. A leaf charging or inlet opening 18 is formed at the upper end of the housing 11 and the lower end of the housing is open to provide a large discharge opening 19.

A first threshing rotor 20, which will be shorter than the remaining rotors, and in a preferred example has an axial length of 30 inches, is disposed within the housing 11 directly below the charging opening 18, while a second rotor 21 is disposed below and to one side of the first rotor, and a third rotor 22 is disposed below and to one side of the second rotor 21. In the preferred embodiment, the rotors 21 and 22 are of the same length as each other and are of greater length than the rotor 20, the rotors 21 and 22 each having an axial length of 42 inches in one preferred embodiment. The threshing rotors 20, 21 and 22 are of similar construction and include, respectively, main shafts 23, 23a and 23b journaled in bearing brackets 24, 24a and 24b fixed to the side walls 12 and 13. The main shafts 23, 23a and 23b carry a series of circular plates 25, 25a and 25b, respectively, fixed to the shafts and spaced from each other for the reception therebetween of rotor teeth or knives 26, 26a and 26b. The knives 26, 26a and 26b are secured against rotation with respect to their associated plates 25, 25a and 25b by parallel flanges 27, 27a and 27b in which the sides of the teeth are snugly fitted. The knives 26, 26a and 26b are further snugly locked in place by means of rods 28, 28a and 28b which extend parallel to the axes of the respective shafts 23, 23a and 23b and through selected ones of the holes 29, 29a and 29b in the circular plates 25, 25a and 25b and through corresponding holes in each tooth.

The teeth or knives 26 of the first stage rotor 20 work against the concave cage 30 formed of laterally spaced, transversely extending parallel grid rods or cylindrical bars 31 which are journaled for rotation about their axes in suitable openings or bearings provided in the side walls 12, 13 of the housing 11 and are spaced to define openings 32 therebetween. The openings 32 between the bars 31 are sized to permit passage into the region below the cage 30 and through the discharge opening 19 the large clean pieces of lamina that are threshed from the leaves by the knives 26 moving through the leaves and by the interaction of the knives 26 with the grid rods 31. The grid rods 31 forming the first stage cage 30 are driven in corresponding directions about their axes by means of pulleys 33 fixed to the ends of the grid rods 31 projecting externally of the housing 11, about which are trained belts 34 which are also trained about a drive pulley 35 fixed to an exterior end of the main shaft 23 and about a conventional tension pulley 36. The main shaft 23 of the first stage rotor 20 is driven by any suitable motor or driving means (not shown) in a manner similar to conventional tobacco threshing machines.

Similar concave cages 37, 37a form curved grids for the second and third stage rotors 21 and 22 and extend in substantially concentric relation below the rotors 21 and 22 so that the curvature of the cages 37, 37a follows the axis of rotation of the associated second and third stage rotor knives 26a, 26b. The cages 37 and 37a may be formed of a concave curved sheet metal plate which is provided with rows of zig zag shaped or other conventionally configurated slots or openings 38, 38a. The cages 37, 37a are slightly spaced from the outer ends of the knives 26a, 26b to serve to retain the material which is being threshed in the effective working zones of the knives and prevent it from falling too quickly away from the working zone.

Figure 4:
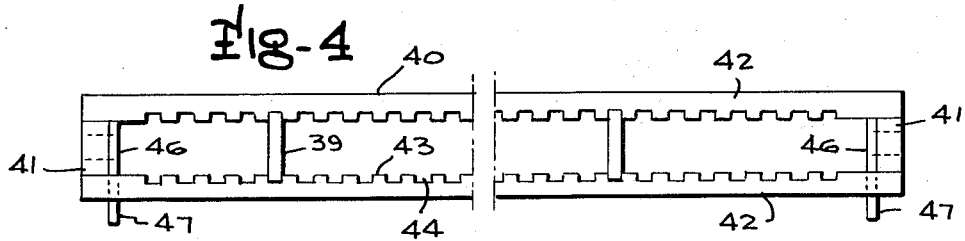
FIG. 4 is a fragmentary section view of the stationary knife holder and some of the knives, taken along the line 4—4 of FIG. 3.

To further produce effective removal of leaf lamina from stems and heavy veins in the third stage, a plurality of stationary knives 39 are located to the left of the rotor 22 slightly above the axis of the rotor, as viewed in FIG. 3. The stationary knives 39 are disposed in side-by-side transverse alignment with their bases inserted in the slot of a multislotted knife bar 40 as illustrated in FIG. 4, which may conveniently be carried by parts of the concave door 16. The slotted knife bar 40 may include two opposite end blocks 41 located at opposite ends of slotted walls 42 extending in parallel horizontal relation, the walls 42 being provided on their adjacent faces with alternate ridges and grooves 43 and 44 providing slots into which the knives 39 may be inserted. The bases of the knives 39 and the end blocks 41 are apertured to receive therethrough locking rods 45 similar in construction in operation to the locking rods 28, 28a and 28b of the rotors 20, 21 and 22. Additional end plate members 46 are provided at the opposite ends of the slotted knife bar 40 and include a depending tab or tail 47 shaped to prevent the curved cage or grid member 37a from becoming loose and shifting out of its normal position into obstructing relation to the rotor knives 26b. Similar retaining elements are provided on the side walls 12, 13 of the casing for the opposite end of the cage or grid member 37 and 37a.

The second stage rotor 21 is driven in a corresponding direction to the first stage rotor 20 by any suitable means, such as a belt connection between the main shaft 23 and 23a. It will be noted that the spacing between the main shafts 23 and 23a of the rotors 20 and 21 is such that the knives 26a of the second stage rotor 21 lap in inter-leaving relation the knives 26 of the first stage rotor 20, providing a counterrotational zone whereby the knives 26a positively take away from the knives 26 the mixed pieces of lamina and stem transported by the knives 26 to the counter-rotational zone permitting a faster processing of the material by reducing the carry over or recirculation of the tobacco within the first stage. A similar counter-rotational zone is provided between the knives 26a of the second rotor 21 and the knives 26b of the third rotor 22 in the inter-leaving portions of the paths of the knives 26a and 26b.

Referring more particularly to FIG. 2, it will be apparent that a recirculation inlet 50 is provided at the right hand end of the threshing machine as viewed in FIG. 2 above the counter-rotational zone for the knives 26a, 26b of the rotors 21, 22, by disposing the recirculation inlet 50 to the right of the shorter first stage rotor 20 and aligning the left hand end of the first stage rotor 20 with the left hand ends of the longer second and third stage rotors 21 and 22. Also, the second stage rotor 21 has no rotor knives along the portion thereof located below and in alignment with the recirculation inlet 50. In this manner, any product which is deposited in the recirculation inlet 50, whether it be fresh product which requires only one stage of threshing or whether it be mixed lamina and stem product which has already been once processed through the machine, is dropped through the space adjacent the end portion of the second stage rotor 21 which carries no knives and into the zone of action of the knives 26b of the third stage rotor 22, where the product is threshed by interaction of the knives 26b against the concave curved cage 37a and the interaction of the knives 26b with the stationary knives 39.

The rotors may each have additional rods and counterbalancing discs extending through the arrays of spaced circular plates 25, 25a and 25b, in accordance with the disclosure of our earlier U.S. Pat. no. 3,141,485. Furthermore, the series of holes 29, 29a and 29b adjacent the peripheries of the circular plates may include holes which are not directly associated with the pairs of flanges 27, 27a and 27b for the purpose of permitting mounting of knives or teeth 26, 26a and 26b on the rotors without holding them at fixed radial positions, thereby permitting the knives to swing about the axes of the retaining rods 28, 28a and 28b to provide a hammermill type rotor. It will also be appreciated that the spacing of the teeth 26b for the third stage rotor 22 may be a different tooth spacing from that of the first and second stage rotors 20 and 21, or a different basket grid 37a from the basket grid 37 for the second stage rotor may be employed with the third stage rotor to produce a different product in the third stage area alone.

The product which is discharged through the bottom opening 19 of the threshing machine is, in accordance with conventional practice, received on some conventional collecting means, such as a mechanical conveying belt, or a feed inlet for a pneumatic conveying system, to be collected and conveyed to a separator of conventional construction which separates the discharged product into the desired components.

It has been discovered that by use of this apparatus, a substantial upgrading in the threshing product is achieved, in that larger clean lamina product is produced and the mixed lamina and stem product which is discharged can be more readily separated by pneumatic separators for removal of the clean lamina pieces from the mixed product. A greater volume of material can be processed per unit time by this device, and by providing the plural zone threshing in one machine, there is reduced opportunity for moisture release from the tobacco product, such as may occur where intervening air separators are provided between several successive threshing machines stations, so that the tobacco is being processed when it is in the best condition, moisture wise, for effective threshing. The particular arrangement herein disclosed also provides great versatility in the provision of a single threshing machine which can do a total threshing job, permitting three stage processing of tobacco product, recirculation of certain desired portions of the discharge product, single stage processing of product introduced through the recirculation inlet, and permitting different types of concave cages to be used with the second and third rotor stages respectively to attain different types of threshing action where desired. What is claimed is:

1. A tobacco threshing machine comprising a casing having a first charging opening at the top thereof and a discharge opening at the bottom thereof, three vertically spaced parallel transverse shafts journaled in said casing, first, second and third serially arranged threshing rotors mounted on said shafts, said second rotor being located below and to one side of said first rotor and said third rotor being located below and to one side of said second rotor, each of said threshing rotors having radially projecting leaf cutting knives axially and circumferentially disposed thereon, said first rotor being arranged to receive tobacco leaves from said first charging opening and convey the leaves toward the second rotor, drive means rotating said rotors in the same direction, grid means providing concave grid structures adjacent the periphery of each of said rotors to provide a grid formation between the associated rotor and the discharge opening, said rotors having first and second opposite ends, said first threshing rotor having a shorter axial length than said second and third threshing rotors with the first ends thereof in vertical alinement and the second end of said first rotor spaced inwardly of the second ends of said second and third rotors, said second threshing rotor being devoid of leaf cutting knives over the end portion thereof adjacent and coextensive with the space between its second end and the second end of said first rotor, and means forming a second charging opening spanning the space between the second ends of said first rotor and second rotors and vertically overlying said third rotor for passage of leaf product gravitationally into the zone of action of the knives of said third rotor for threshing by said third rotor and its associated grid means.

2. A tobacco threshing machine as defined in claim 1, wherein said grid means associated with said first rotor comprises a plurality of circumferentially spaced rotatable grid rods extending transversely in the casing along a concave path substantially concentric with the first rotor shaft adjacent the periphery of said first rotor to provide a grid formation between said first rotor and the discharge opening, and drive means for rotating said grid rods in the same direction of rotation of said rotors.

3. A tobacco threshing machine as defined in claim 2, wherein said rotatable grid rods extend along the concave path through a substantially quadrantal arc terminating adjacent the vertical plane including said first rotor shaft, said concave path being located immediately outwardly of the path traversed by the outermost edges of the knives of said first rotor during rotation thereof.

4. A tobacco threshing machine as defined in claim 1, wherein said grid means for said second and third rotors each comprise a concave plate of sheet material having a plurality of axially spaced circumferentially extending zig-zag slots bounded by leaf cutting edges extending over the area thereof sized to pass pieces of clean lamina and stems of selected small size therethrough.

5. A tobacco threshing machine as defined in claim 2, wherein said grid means for said second and third rotors each comprise a concave plate of sheet material having a plurality of axially spaced circumferentially extending zig-zag slots bounded by leaf cutting edges extending over the area thereof sized to pass pieces of clean lamina and stems of selected small size therethrough.

6. A tobacco threshing machine as defined in claim 2, wherein said grid means for said second and third rotors each comprise a concave plate of sheet material having a plurality of axially spaced circumferentially extending zig-zag slots bounded by leaf cutting edges extending over the area thereof sized to pass pieces of clean lamina and stems of smaller size than that passed between said grid rods.

7. A tobacco threshing machine as defined in claim 1, wherein said grid means adjacent said second and third rotors each comprise a concave plate of sheet material having a plurality of axially spaced circumferentially extending zig-zag slots bounded by leaf cutting edges extending over the area thereof sized to pass pieces of clean lamina and stems of selected size therethrough, and said machine including stationary leaf cutting knives supported in said casing projecting inwardly from the casing in the path of rotation of the knives of the third rotor positioned to intermesh therewith and lying in a substantially horizontal common plane located adjacent an end of the concave grid plate for said third stage remote from the terminus of said concave path.

8. A tobacco threshing machine as defined in claim 2, wherein said grid means adjacent said second and third rotors each comprise a concave plate of sheet material having a plurality of axially spaced circumferentially extending zig-zag slots bounded by leaf cutting edges extending over the area thereof sized to pass pieces of clean lamina and stems of selected size therethrough, and said machine including stationary leaf cutting knives supported in said casing projecting inwardly from the casing in the path of rotation of the knives of the third rotor positioned to intermesh therewith and lying in a substantially horizontal common plane located adjacent an end of the concave grid plate for said third stage remote from the terminus of said concave path.

9. A tobacco threshing machine as defined in claim 2, wherein said grid means adjacent said second and third rotors each comprise a concave plate of sheet material having a plurality of axially spaced circumferentially extending zig-zag slots bounded by leaf cutting edges extending over the area thereof sized to pass pieces of clean lamina and stems of smaller size than that passed by said grid rods, and said machine including stationary leaf cutting knives supported in said casing projecting inwardly from the casing in the path of rotation of the knives of the third rotor positioned to intermesh therewith and lying in a substantially horizontal common plane located adjacent an end of the concave grid plate for said third stage remote from the terminus of said concave path.

* * * * *